(12) United States Patent
Yushin et al.

(10) Patent No.: US 10,109,885 B2
(45) Date of Patent: Oct. 23, 2018

(54) COMPLEX ELECTROLYTES AND OTHER COMPOSITIONS FOR METAL-ION BATTERIES

(71) Applicant: Sila Nanotechnologies, Inc., Alameda, CA (US)

(72) Inventors: Gleb Yushin, Atlanta, GA (US); Bogdan Zdyrko, Clemson, SC (US); Hyea Kim, Atlanta, GA (US); Igor Luzinov, Seneca, SC (US); Yuriy Bandera, Atlanta, GA (US); Eugene Berdichevsky, Oakland, CA (US)

(73) Assignee: Sila Nanotechnologies, Inc., Alameda, CA (US)

( * ) Notice: Subject to any disclaimer, the term of this patent is extended or adjusted under 35 U.S.C. 154(b) by 169 days.

(21) Appl. No.: 14/706,740

(22) Filed: May 7, 2015

(65) Prior Publication Data
US 2015/0325882 A1    Nov. 12, 2015

Related U.S. Application Data

(60) Provisional application No. 61/989,984, filed on May 7, 2014.

(51) Int. Cl.
*H01M 10/0568* (2010.01)
*H01M 4/134* (2010.01)
(Continued)

(52) U.S. Cl.
CPC ..... *H01M 10/0568* (2013.01); *H01M 2/1673* (2013.01); *H01M 4/134* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,763,382 B2 * | 7/2010 | Riley, Jr. | H01M 4/38 427/115 |
| 8,450,012 B2 | 5/2013 | Cui et al. | |
| 8,637,185 B2 | 1/2014 | Berdichevsky et al. | |
| (Continued) | | | |

OTHER PUBLICATIONS

G. Yushin et al., "Deformations in Si—Li Anodes Upon Electrochemical Alloying in Nano-Confined Space," Journal of the American Chemical Society, Published on the Web, Jun. 8, 2010.

*Primary Examiner* — Kaity V Chandler
(74) *Attorney, Agent, or Firm* — Steven Driskill

(57) ABSTRACT

Batteries such as Li-ion batteries are provided that comprise anode and cathode electrodes, an electrolyte ionically coupling the anode and the cathode, and a separator electrically separating the anode and the cathode. In some designs, the electrolyte may comprise, for example, a mixture of (i) a Li-ion salt with (ii) at least one other metal salt having a metal with a standard reduction potential below −2.3 V vs. Standard Hydrogen Electrode (SHE). In other designs, the electrolyte may be disposed in conjunction with an electrolyte solvent that comprises, for example, about 10 to about 100 wt. % ether. In still other designs, the battery may further comprise anode and cathode interfacial layers (e.g., solid electrolyte interphase (SEI)) disposed between the respective electrode and the electrolyte and having different types of fragments of electrolyte solvent molecules as compared to each other.

14 Claims, 5 Drawing Sheets

(51) Int. Cl.
  *H01M 2/16* (2006.01)
  *H01M 10/052* (2010.01)
  *H01M 10/058* (2010.01)
  *H01M 4/38* (2006.01)
(52) U.S. Cl.
  CPC ....... *H01M 10/052* (2013.01); *H01M 10/058* (2013.01); *H01M 4/386* (2013.01); *H01M 2300/0025* (2013.01)

(56) References Cited

U.S. PATENT DOCUMENTS

| | | | |
|---|---|---|---|
| 8,859,143 B2* | 10/2014 | Zhamu | H01M 4/13 429/188 |
| 9,722,289 B2* | 8/2017 | Zheng | H01M 12/08 |
| 2002/0055040 A1 | 5/2002 | Mukherjee et al. | |
| 2002/0110739 A1* | 8/2002 | McEwen | H01G 9/022 429/324 |
| 2003/0157407 A1* | 8/2003 | Kosuzu | H01M 4/134 429/231.95 |
| 2005/0196670 A1* | 9/2005 | Yamaguchi | H01M 4/134 429/200 |
| 2012/0100438 A1 | 4/2012 | Fasching et al. | |
| 2012/0202112 A1 | 8/2012 | Yushin et al. | |
| 2012/0251886 A1 | 10/2012 | Yushin et al. | |
| 2012/0321959 A1 | 12/2012 | Yushin et al. | |
| 2012/0321961 A1 | 12/2012 | Yushin et al. | |
| 2012/0328952 A1 | 12/2012 | Yushin et al. | |
| 2013/0084474 A1* | 4/2013 | Mills | H01M 4/9016 429/9 |
| 2013/0189592 A1* | 7/2013 | Roumi | H01G 9/048 429/406 |
| 2013/0224594 A1 | 8/2013 | Yushin et al. | |
| 2013/0344391 A1 | 12/2013 | Yushin et al. | |
| 2014/0057179 A1 | 2/2014 | Yushin et al. | |
| 2014/0287301 A1 | 9/2014 | Yushin et al. | |
| 2015/0064568 A1 | 3/2015 | Yushin et al. | |

* cited by examiner

COMPLEX ELECTROLYTES AND OTHER COMPOSITIONS FOR METAL-ION BATTERIES

CLAIM OF PRIORITY UNDER 35 U.S.C. § 119

The present application for patent claims the benefit of U.S. Provisional Application No. 61/989,984, entitled "Complex Electrolytes and Other Compositions for Metal-Ion Batteries," filed May 7, 2014, which is expressly incorporated herein by reference in its entirety.

BACKGROUND

Field

The present disclosure relates generally to energy storage devices, and more particularly to electrolytes for metal-ion battery technology and the like.

Background

Owing in part to their relatively high energy densities, light weight, and potential for long lifetimes, advanced metal-ion batteries such as lithium-ion (Li-ion) batteries are desirable for a wide range of consumer electronics. In many applications, Li-ion batteries have essentially replaced nickel-cadmium and nickel-metal-hydride batteries. Despite their increasing commercial prevalence, however, further development of metal-ion batteries is needed, particularly for potential applications in low- or zero-emission hybrid-electrical or fully-electrical vehicles, consumer electronics, energy-efficient cargo ships and locomotives, aerospace, and power grids. Such high-power applications will require electrodes with higher specific capacities than those used in currently-existing Li-ion batteries.

Currently, carbon-based materials (e.g., graphite) are employed as the predominant anode material in Li-ion batteries. Carbon (C), in the form of graphite, has a maximum or theoretical specific capacity of about 372 milli-Ampere hours per gram (mAh/g). A variety of higher capacity materials have been investigated to overcome the drawbacks of carbon-based materials. Materials that electrochemically alloy with Li and their composites have received great attention as anode candidates because they exhibit specific capacities that are several times greater than that of conventional graphite. Silicon, for example, has the highest theoretical specific capacity among alloying materials, topping out at about 4200 mAh/g.

Conventional implementations of such alloying-type anodes and their composites, however, have been hindered by several problems, including large irreversible capacity losses and relatively low Coulombic Efficiency (CE) during cycling due to relatively large volume changes during cycling and the resulting poor stability of the so-called solid electrolyte interphase (SEI). The SEI comprises products of the electrolyte decomposition on the electrode during cell operation and includes a significant content of Li. In an ideal case, a Li-ion permeable (while electron and solvent impermeable) SEI forms once during the first cycle and remains stable during subsequent cycling. The relatively fast growth of the SEI in high capacity anodes (such as those that comprise alloying-type active material, such as Si) leads to the degradation of cell performance due to irreversible capacity losses (due to more and more Li being trapped within the growing SEI).

The SEI growth is primarily caused by permeation of the electrolyte solvent through the existing SEI to the active material surface at low potentials, followed by its decomposition and the addition of the new decomposed layer to the existing SEI. Alloying-type anodes and their composites often exhibit changes in the outer surface area during metal-ion insertion and extraction, inducing defects in the SEI, through which the undesirable diffusion of the electrolyte solvent may take place.

Some high capacity cathodes also have undesirable reactions with electrolytes. For example, conversion-type sulfur (S)-containing or selenium (Se)-containing cathodes may exhibit dissolution in the electrolyte of their intermediate reaction products (such as lithium polysulfides in the case of Li-ion batteries with sulfur-based cathodes or sodium polysulfides in the case of Na-ion batteries with sulfur-based cathodes). Other high capacity cathodes, such as metal fluorides (iron fluorides, copper fluorides, cobalt fluorides, bismuth fluoride and other transition metal fluorides, their alloys and their mixtures) and metal fluoride-based components, similarly suffer from volume changes and undesirable reactions of electrolytes with the components of the cathodes (such as reactions of electrolyte and metal components of the cathodes).

Some high voltage intercalation-type cathodes (which operate in a potential range up to around 4.6 V vs. Li/Li+) and some very high voltage intercalation-type cathodes (which operate in a potential range up to around 5.5 V vs. Li/Li+) are known to induce oxidation of electrolytes that are compatible with the majority of anode materials (such as carbon, silicon, tin, aluminum, and others). This electrolyte oxidation leads to gassing and rapid cell degradation. As a result, most conventional Li-ion battery cells operate up to around 4.2-4.3 V. Higher voltage cells are desirable, but presently unstable and unsafe.

Accordingly, despite the advancements made in electrode materials, high capacity metal-ion batteries remain somewhat limited in their application and there remains a need for improved batteries, components, and other related materials and manufacturing processes.

SUMMARY

Embodiments disclosed herein address the above stated needs by providing improved electrolyte compositions, improved batteries made therefrom, and methods of making and using the same. Such batteries facilitate the incorporation of advanced material synthesis and electrode fabrication technologies, and enable fabrication of high voltage and high capacity batteries at a cost lower than that of conventional Li-ion battery technology.

In general, batteries such as Li-ion batteries are provided that comprise anode and cathode electrodes, an electrolyte ionically coupling the anode and the cathode, and a separator electrically separating the anode and the cathode. In some designs, the electrolyte may comprise, for example, a mixture of (i) a Li-ion salt with (ii) at least one other metal salt having a metal with a standard reduction potential below −2.3 V vs. Standard Hydrogen Electrode (SHE). In other designs, the electrolyte may be disposed in conjunction with an electrolyte solvent that comprises, for example, about 10 to about 100 wt. % ether. In still other designs, the battery may further comprise anode and cathode interfacial layers (e.g., solid electrolyte interphase (SEI)) disposed between the respective electrode and the electrolyte and having different types of fragments of electrolyte solvent molecules as compared to each other.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

In the description below, several examples are provided in the context of Li-ion batteries because of the current prevalence and popularity of Li-ion technology. However, it will be appreciated that such examples are provided merely to aid in the understanding and illustration of the underlying techniques, and that these techniques may be similarly applied to various other metal-ion batteries, such as Na-ion, Ca-ion, K-ion, Mg-ion, and other metal-ion batteries.

Figure 1:
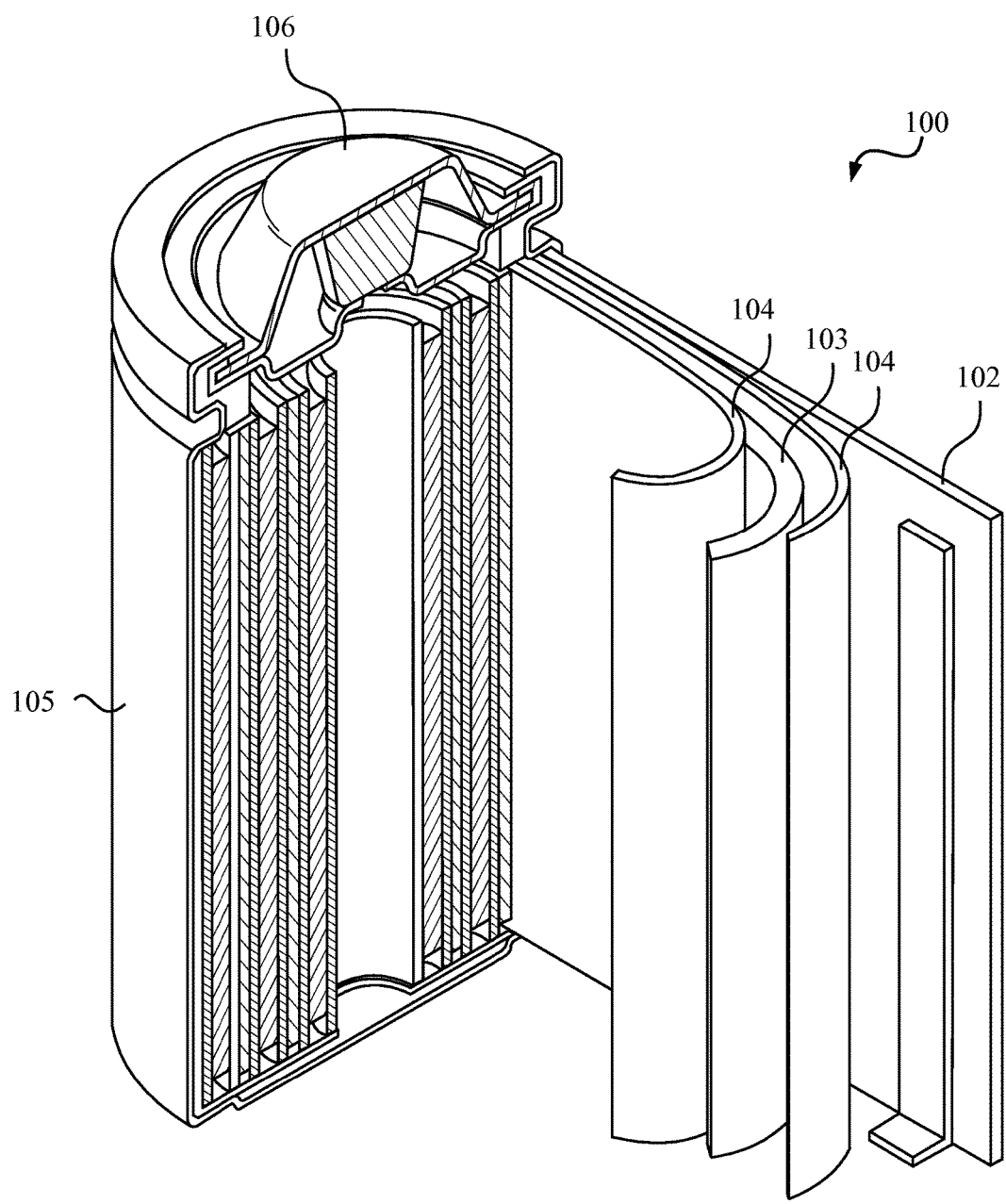
FIG. 1 illustrates an example metal-ion (e.g., Li-ion) battery.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Conventional electrolytes for Li- or Na-based batteries of this type are generally composed of a 1 M solution of a single Li or Na salt (such as an $LiPF_6$ salt for Li-ion batteries and an $NaPF_6$ salt for Na-ion batteries) in a mixture of solvents (such as a mixture of carbonates). The most common salt used in a Li-ion battery electrolyte, for example, is $LiPF_6$, while less common salts include lithium tetrafluoroborate ($LiBF_4$), lithium perchlorate ($LiClO_4$), and some of the lithium imides (such as $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others). These conventional electrolytes do not provide adequate solid electrolyte interphase (SEI) stability or Coulombic Efficiency (CE) for high capacity electrodes, however, and contribute to many of the problems discussed in the background above.

The present disclosure accordingly provides, among other features, improved electrolyte compositions more suitable for high capacity electrode applications that combat SEI growth on high capacity anodes and reduce undesirable reactions with high capacity cathodes. These so-called "complex" electrolyte compositions introduce a mixture of salts, which may comprise not only salt(s) containing the active ions of interest (such as Li salts for rechargeable Li batteries), but also salt(s) that may contain ions distinct from the active ions of interest (such as metal ions other than Li for rechargeable Li batteries). These "complex" electrolyte compositions may also introduce the use of solvents that are not typically used in applications due to the often undesirable side reactions on one of the electrodes. These "complex" electrolyte compositions may also introduce a high concentration of salt(s), which is not typically used in applications due to unfavorable performance or increased cost. The present disclosure combats these shortcomings, while taking advantage of the identified benefits, which were often unexpected.

One of the key functions of these additional salts in the salt mixture or, more generally, of the disclosed "complex" electrolyte compositions, is to favorably modify the mechanical, physical, and chemical properties of the SEI formed on the surface of the active particles. In particular, (i) to induce polymerization within the SEI to enhance its mechanical stability, (ii) to enhance adhesion of the SEI to the active particles, (iii) to enhance the transport of Li ions (in the case of rechargeable Li batteries; or other metal ions that transfer charge in other rechargeable metal-ion batteries) within the formed SEI, (iv) to reduce the diffusion of electrolyte solvents (such as carbonates, to provide an example) through the SEI in order to prevent the SEI growth, while retaining or enhancing the electrode rate performance, and (v) to reduce the energy barrier for Li ion desolvation at the liquid electrolyte/SEI interface. For Li metal batteries (including Li alloy batteries), additionally important features include the formation of an SEI that also (vi) substantially minimizes (and in an ideal case, eliminates) Li dendrite growth (e.g., due to increased mobility of Li at the surface or due to higher interfacial energy of Li, or other known or unknown factors) and (vii) increases the Li ion transference number.

Other compositions are also provided to combat electrolyte decomposition, including polymer coating enhancements and various functional group additions to other battery components, each of which is discussed in more detail below. The improved electrolytes and electrolyte-electrode material combinations provided herein may be used to help facilitate new applications and advance the adoption of so-called high-power devices such as those discussed in the background above.

For simplicity of illustration, the complex electrolytes may be described below generally with reference to a Si-containing anode and a mixture of salts for Li-ion batteries. It will be appreciated that other embodiments may similarly provide benefits for other high capacity (e.g., greater than 380 mAh/g) anodes (such as Al, P, Sb, or Sn-containing anodes, to name a few) and high capacity (e.g., greater than 250 mAh/g) cathodes (such as cathodes comprising various metal fluorides, such as $CuF_2$, $FeF_2$, $FeF_3$, $NiF_2$, $AgF_2$, $CoF_2$, $NiF_2$, $BiF_3$, $BiF_5$, LiF, and their mixtures and alloys, among others; various metal chalcogenides, such as $Li_2S$, S, $Li_2Se$, Se, $Li_2Te$; or other conversion type materials and their mixtures and composites, to name a few), and that a variety of high capacity active materials may be advantageously used in combination with the complex electrolytes and electrolyte-electrode material combinations provided herein for Li-ion and other metal-ion batteries, such as Na-ion batteries. More generally, such high capacity active materials may include other materials (including composites) that experience significant volume changes during insertion and extraction of metal ions (e.g., greater than about 8 vol. %) during metal-ion battery operation.

In addition, in the description below, the majority of anode examples are provided in the context of Li-free anodes (such as anodes comprising carbon, silicon, tin and other known anode materials) because of the current prevalence and popularity of Li-ion technology, which typically comprises Li-free graphite anodes with the occasional inclusion of small amounts of other elements, such as silicon or tin. However, it will be appreciated that such examples are provided merely to aid in the understanding and illustration of the underlying techniques of building a more stable SEI layer on the anodes, and that these techniques may be similarly applied to Li-comprising anodes, including lithiated anodes (for example, lithiated anodes comprising silicon and carbon) as well as Li metal and Li alloy anodes for use in Li metal batteries. For Li metal and Li metal alloy anodes, many of these techniques not only improve SEI stability, but also substantially diminish (or completely eliminate) the growth of Li dendrites, which may induce cell damage and present safety hazards. Similarly, some of the below techniques are applicable to metal batteries, such as Na metal batteries, Mg metal batteries, and other metal or metal alloy batteries. Some of the techniques described below are particularly useful for rechargeable metal batteries, such as rechargeable Li metal or Li alloy metal batteries.

Among high capacity anodes for Li-ion batteries, examples of such materials include compositions comprising: (i) heavily (and "ultra-heavily") doped silicon (Si); (ii) group IV elements; (iii) binary silicon alloys (or mixtures) with metals; (iv) ternary silicon alloys (or mixtures) with metals; (v) aluminum (Al); (vi) phosphorus (P) and (vii) other metals and metal alloys that form alloys with lithium (Li) or the like.

Heavily and ultra-heavily doped silicon include silicon doped with a high content of Group III elements, such as boron (B), aluminum (Al), gallium (Ga), indium (In), or thallium (Tl), or a high content of Group V elements, such as nitrogen (N), phosphorus (P), arsenic (As), antimony (Sb), or bismuth (Bi). By "heavily doped" and "ultra-heavily doped," it will be understood that the content of doping atoms is typically in the range of about 3,000 parts per million (ppm) to about 700,000 ppm, or approximately 0.3% to 70% of the total composition.

Group IV elements used to form higher capacity anode materials may include Ge, Sn, Pb, and their alloys, mixtures, or composites, with the general formula of $Si_a$—$Ge_b$—$Sn_e$—$Pb_d$—$C_e$-$D_f$, where a, b, c, d, e, and f may be zero or non-zero, and where D is a dopant selected from Group III or Group V of the periodic table.

For binary silicon alloys (or mixtures) with metals, the silicon content may be in the range of approximately 20% to 99.7%. Examples of such alloys (or mixtures) include, but are not limited to: Mg—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr, —Si, Nb—Si, Mo—Si, Ru—Si, Rh—Si, Pd—Si, Ag—Si, Cd—Si, Ba—Si, Hf—Si, Ta—Si, and W—Si. Such binary alloys may be doped (or heavily doped) with Group III and Group V elements. Alternatively, other Group IV elements may be used instead of silicon to form similar alloys or mixtures with metals. A combination of various Group IV elements may also used to form such alloys or mixtures with metals.

For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. Alternatively, other Group IV elements may be used instead of silicon to form similar alloys or mixtures with metals. A combination of various Group IV elements may also be used to form such alloys or mixtures with metals.

Examples of other metals and metal alloys that form alloys with lithium include, but are not limited to, Mg, Sn, Sb, P, Al, Ga, In, Ag, Zn, Cd, Pb, etc., as well as various combinations formed from these metals, their oxides, etc.

For rechargeable Li or rechargeable Na batteries that comprise powder-based anodes, some aspects of the present disclosure for enhancing the anode SEI properties are particularly attractive for (nano)composite particles that (i) contain a high capacity anode material (such as Si, as an example), (ii) experience volume changes in the range of about 8 to about 70 vol. %, either during the so-called formation cycles or during regular battery cycling, and (iii) have an average particle size in the range of about 0.1 μm to about 20 μm.

For rechargeable Li batteries that comprise high capacity (e.g., a capacity in excess of about 250 mAh/g), powder-based cathodes, some aspects of the present disclosure for enhancing the cathode SEI properties are particularly attractive for (nano)composite particles that (i) experience volume changes in the range of about 5 to about 50 vol. %, either during the so-called formation cycles or during regular battery cycling, and (ii) have an average particle size in the range of about 0.1 μm to about 20 μm.

For certain embodiments, the complex electrolyte compositions provided herein may generally comprise a mixture of a monovalent metal ion salt (such as $LiPF_6$ in the case of rechargeable Li batteries) with another salt (or mixture of salts) comprising a rare earth metal (such as La, Y, Sc, Ce, to name a few examples). Examples of such rare earth salts for rechargeable Li batteries include, but are not limited to, lanthanum(III) bis(trifluoromethanesulfonyl)imide (La(TFSI)$_3$), lanthanum(III) bis(fluorosulfonyl)imide (La(FSI)$_3$), lanthanum(III) hexafluorophosphate (La(PF$_6$)$_3$), lanthanum(III) tetrafluoroborate (La(BF$_4$)$_3$), and others. Depending on the application and cell composition, the total concentration of rare earth salt(s) in electrolytes may range from as little as 0.01M to approximately 1M. Higher concentration(s) may, in principle, be also used, but they may unfavorably increase electrolyte cost, increase electrolyte viscosity, and often unfavorably reduce other electrolyte and cell properties, such as rate performance and, sometimes, cycle stability. The inventors have found that rare earth metals with standard reduction potential below −2.0 V vs. Standard Hydrogen Potential (SHE), or more preferably below −2.3 V vs. SHE, are particularly useful in the corresponding salts.

As a specific illustrative example, a complex electrolyte composition may include a mixture of 1M of $LiPF_6$ salt (in the case of Li-ion batteries) with 0.1M of La(TFSI)$_3$ for use in conjunction with corresponding electrodes, such as Si-comprising composite anodes (or anodes comprising other lithium-alloying active materials), high capacity conversion type cathodes, and so on. The inventors have discovered, for example, that the addition of some La salts of tetrafluoroborate, perchlorate or imides to the electrolyte results in improvements in SEI stability and CE of Li-ion batteries comprising high capacity electrodes, such as those containing Si.

In other embodiments, the complex electrolyte compositions provided herein may generally comprise a mixture of a monovalent metal ion salt (such as $LiPF_6$ in case of rechargeable Li batteries) with another non-Li salt (or mixture of salts) comprising the following example metals: (i) alkaline metals, (ii) selected alkaline earth metals, and (iii) selected transition metals, among others. Examples of suitable alkaline metals for the formation of such salts may include, but are not limited to Cs. Examples of suitable alkaline earth metals for the formation of such salts may include, but are not limited to Ca, Sr, Ba, and Mg. Examples of suitable transition metals for the formation of such salts may include, but are not limited to: Zr, Hf, Ta, and Cu. While the presence of transition metal salts have traditionally thought to be highly negative due to the expected damages in the SEI (based on the prior studies of Mn, Co, and Ni salts), the addition of other suitable transition metal salts (including those mentioned above) to the electrolyte may be unexpectedly advantageous.

For certain embodiments, the complex electrolyte compositions provided herein may generally comprise a mixture of a monovalent metal ion salt (such as $LiPF_6$ in the case of rechargeable Li batteries, as an example) with (i) an elemental iodine or (ii) iodine-comprising salts. Examples of suitable iodine-containing salts may include, but are not limited to: LiI, $MgI_2$, $LaI_3$, and others. Rather unexpectedly, such electrolyte additives were found to noticeably enhance cell stability and in some cases enhance cell rate, cell specific power, and other performance characteristics. While the overall origin of the performance enhancement is not yet completely clear, the inventors believe that I-containing electrolytes (such as electrolytes with, for example, $I_2$ or LiI addition) enhance mechanical properties of the SEI, reduce solvent permeation through this SEI, and possibly enhance the Li transport through the SEI. It is possible that inclusions of LiI into the formed SEI on either a cell high capacity anode (such as Li or (nano)composite Si-comprising anode, as specific examples) or a cell high capacity cathode (such as conversion-type cathode, such as sulfur-comprising or metal fluoride comprising (nano)composite cathode, as specific examples) or both (in the case when a Li rechargeable battery comprises both types of electrodes) enhance Li transport through the SEI, while assisting in de-solvating the incoming Li ion. In addition, the use of electrolytes comprising I or I-containing salt(s) (such as LiI, $MgI_2$, NaI, $LaI_3$, and others) may substantially reduce (or even eliminate) Li dendrite growth and enhance the stability of Li metal anodes.

Certain precautions may be taken when utilizing electrolytes comprising iodine in the cell design. For example, if it is desired to prevent oxidation of iodine (or iodine-comprising salt), cathodes that are not exposed to potential above 4.0-4.3 V vs. Li/Li+ may be used. Examples of suitable cathodes may include various metal fluorides, metal chlorides, sulfur, lithium sulfide, and other low or medium voltage cathodes. However, if iodine is mostly consumed during SEI formation(s), then higher voltage cathodes can also be used.

For high capacity anodes in Li-ion or Li-metal cells (including, for example, Si-comprising anodes as well as Li metal anodes), the use of electrolytes comprising I or I-containing salt(s) may provide further enhanced properties (e.g., better stability or reduced resistance) when used in combination with lithium bis(fluorosulfonyl)imide (LiFSI), $LiN(CF_3SO_2)_2$ (LiTFSI), $LiCF_3SO_3$, $LiSO_3F$, $Li_2F[SbF_6]$, $LiC(CF_3SO_2)_3$, $LiC_2F_5SO_3$, $LiN(C_2F_5SO_2)_2$, $LiN(C_2F_5SO_2)(SO_2CF_3)$, $LiN(CF_2CF_3SO_2)_2$, $LiN(SO_2CF_2OCF_3)_2$, $LiNC_6F_5SO_2CF_3SO_2$, and other suitable Li imides. In some designs, similar salts of La, Y, Sc, Ce, Mg, and other metals discussed above may be utilized instead of Li salts. Such electrolytes may further comprise $LiPF_6$ because this Li salt provides other benefits (e.g., it stabilizes the use of Al current collectors against oxidation at above 4 V vs. Li/Li+, it is inexpensive, it provides high Li-ion mobility in electrolytes, etc.).

In some embodiments (particularly when using high capacity Si-comprising anodes in Li-ion cells, or Li metal or Li alloy anodes in Li metal cells), the use of electrolytes comprising I or I-containing salt(s) may provide further enhanced properties of the cell (e.g. better stability or reduced resistance) when used in combination with LiF present in the electrolyte. LiF may also be added to other parts of the cell, such as to one of the electrodes (e.g., in an anode or in a cathode) or incorporated into the separator. Due to low solubility of LiF in electrolyte solvents, the addition of excess of LiF into the battery (above the solubility limit) provides a continuous supply of LiF even when it is consumed on the anode or the cathode. Furthermore, if cathodes comprise various metal fluoride materials (e.g., LiF, $CuF_2$, $FeF_2$, $FeF_3$, $BiF_5$, $BiF_3$, their various alloys and mixtures, as a few illustrative examples), the presence of LiF in the electrolyte may contribute to reduced dissolution and thus to further improved cell stability. In some cases, LiF may also be added indirectly—e.g. as a component of the salt, which decomposes on at least one of the electrodes with the LiF formation.

Conventional solvents utilized in commercial Li-ion battery electrolytes contain a mixture of cyclic and linear carbonates (including fluorinated carbonates), such as ethylene carbonate (EC), ethyl methyl carbonate (EMC), propylene carbonate (PC), diethyl carbonate (DEC), vinylene carbonate (VC), vinyl ethylene carbonate (VEC), dimethyl carbonate (DMC), and others, and various fluorine-containing carbonates, such as FEC, to name a few. While ether solvents have been used in cells utilizing low-voltage S, $Li_2S$, Se, and $Li_2Se$ cathodes or in anode half-cells (where the anode is cycled against Li metal foil during research and development studies), these solvents have not been used in commercial Li-ion battery electrolytes due to their poor stability on cathodes exposed to above around 3.5 V vs. Li/Li+, where ether oxidation induced oxidation and the formation of gases, leading to rapid cell failure. Yet, ether solvents (or co-solvents) may be particularly attractive for building a favorable SEI on high capacity anodes, such as Si-comprising anodes, Li metal anodes, and other high energy density anodes.

In some embodiments, ether solvents may be used in Li and Li-ion cells by preventing their unfavorable oxidation on the cathode. The following methods and their combinations may be utilized. First, the stability of medium-to-high voltage cells (cells comprising cathodes exposed to above around 3.5 V vs. Li/Li+ during charge-discharge cycling, cells comprising cathodes having an average potential of around 2.6 V vs. Li/Li+ or more, or cells with an average voltage of 2.6-3.8 V) with an electrolyte comprising ether solvent(s) (in the amount of 10-100% of the total amount of the solvent in liquid organic electrolyte) may be enhanced when ether(s) are used in conjunction with iodine or iodine-comprising salt(s), such as LiI and others, as described above. Second, the stability of medium-to-high voltage cells (cells comprising cathodes exposed to above around 3.5 V vs. Li/Li+ during charge-discharge cycling) with an electrolyte comprising ether solvent(s) (in the amount of 10-100% of the total amount of the solvent in liquid organic electrolyte) may be enhanced when the total concentration of Li salts in ether(s)-comprising electrolytes exceeds 2M (preferably 2.5M). A very high concentration of salts in the electrolyte (e.g., higher than 4M) may further enhance cell stability, but these electrolytes sometimes suffer from other limitations, such as higher cost, higher density, and lower conductivity, to name a few. Third, the stability of medium-to-high voltage cells (cells comprising cathodes exposed to above around 3.5 V vs. Li/Li+ during charge-discharge cycling) with an electrolyte comprising ether solvent(s) (in the amount of 10-100% of the total amount of the solvent in liquid organic electrolyte) may be enhanced when, before exposing to ether-based electrolyte, these high voltage cathodes are first exposed (and more preferably, at least partially discharged or at least partially charged, or even cycled) in ether-free electrolytes, whereby the surface of the cathodes becomes coated (or "terminated") with a "cathode SEI" layer. Examples of electrolytes suitable for terminating the medium-to-high voltage cathodes (e.g., cathodes that are exposed to above around 3.5 V vs. Li/Li+ during charge-discharge cycling in cells) include solutions of Li salt(s) (e.g., $LiPF_6$ salt or a mixture of $LiPF_6$ and Li imide salts or LiBOB or other suitable Li salts and their combinations) in carbonate solvents (including fluorinated carbonates since fluorination typically increases solvent oxidation potential). In addition to (i) carbonate solvents, other solvents that exhibit high stability against oxidation may also be utilized alone or as a mixture with carbonate co-solvents or other co-solvents. These include, but are not limited to: (ii) carboxylates (including fluorinated carboxylates); (iii) lactones (particularly fluorinated lactones); (iv) nitriles (such as acetonitrile) and dinitriles (such as malononitrile, succinonitrile, glutaronitrile, adiponitrile, pimelonitrile, suberonitrile, azelanitrile, and sebaconitrile, to name a few), (v) other solvents that do not oxidize when exposed to potentials above 4.0 V vs. Li/Li+, and (vi) their mixtures. Forth, the stability of medium-to-high voltage cells (e.g., cells comprising cathodes exposed to above around 3.5 V vs. Li/Li+ during charge-discharge cycling) with an electrolyte comprising ether solvent(s) (in the amount of 10-100% of the total amount of the solvent in liquid organic electrolyte) may be enhanced when ether-free polymer electrolyte(s) are infiltrated into these medium-to-high voltage cathodes. Fifth, the stability of medium-to-high voltage cells (e.g., cells comprising cathodes exposed to above around 3.5 V vs. Li/Li+ during charge-discharge cycling) with an electrolyte comprising ether solvent(s) (in the amount of 10-100% of the total amount of the solvent in liquid organic electrolyte) may be enhanced when these medium-to-high voltage cathodes are conformally coated with a thin (preferably from about 2 nm to about 200 nm) Li-ion permeable, but electrically insulative (not permeable to electrons) layer that is not permeable to ether solvents and preferably does not dissolve in ether-comprising electrolyte solvent(s). Examples of suitable materials for such a layer include, but are not limited to, selected oxides, sulfides, nitrides, and fluorides that do not dissolve in cell electrolytes. Such layers may be deposited by electrodeposition, electroless deposition, chemical vapor deposition, atomic layer deposition and other suitable methods of conformal deposition of thin films. The methods described above may also be used for solvents (or co-solvents) other than ethers, but which similarly provide enhanced performance on the anode, but suffer from somewhat poor stability on some cathodes. Examples include, but are not limited to, butyrates, sulfites, and others.

Returning to complex and favorable electrolyte compositions comprising multiple salts, in yet other embodiments, the complex electrolyte compositions provided herein may generally comprise a mixture of a monovalent metal-ion salt (such as $LiPF_6$ in the case of rechargeable Li batteries, to provide a specific example) with an alkaline metal salt of FSI, such as LiFSI (to provide a specific example). Rather unexpectedly, such electrolyte additives were found to greatly enhance SEI film forming properties, noticeably enhance cell stability, and enhance cell rate, cell specific power, and other performance characteristics. Depending on the application and cell composition, the total concentration of alkaline metal salt(s) of FSI salt(s) in electrolytes may range from as little as 0.01M to approximately 3M. A high concentration of FSI salt(s) (1.0-3M) may enhance SEI properties. Higher than 3M concentration(s) of FSI salts may, in principle, also be used, but they may unfavorably increase electrolyte cost. As a concrete example, an illustrative complex electrolyte composition may include a mixture of 1M of $LiPF_6$ salt (for Li-ion batteries) with 0.2M of LiFSI for use in conjunction with corresponding electrodes, such as Si-comprising composite anodes (or anodes comprising other lithium-alloying active materials), high capacity conversion type cathodes (such as sulfur, sulfide, metal halide, and other high capacity cathodes), and so on. As another specific example, an illustrative complex electrolyte composition may include a mixture of 0.1M of LiTFSI salt (for Li-ion batteries) with 3M of LiFSI for use in conjunction with corresponding electrodes, such as Si-comprising composite anodes (or anodes comprising other lithium-alloying active materials), high capacity conversion type cathodes, and so on.

In some embodiments, conducting a so-called "formation" cycle of the rechargeable Li battery comprising above-discussed salts (such as an alkaline metal salt of FSI within the electrolyte, such as LiFSI, or a rare earth salt, such as $La(TFSI)_3$) at elevated temperatures (such as 30-60° C., for example) provides advantages in terms of the favorable properties of the SEI formed on high capacity anode(s) and high capacity cathode(s). Such favorable properties include a higher degree of polymerization, better mechanical properties, in some cases a higher rate of Li transport and a significantly slower rate of solvent diffusion through the thus formed SEI.

For rechargeable Li-ion battery cells that comprise anodes that are exposed to above around 1 V vs. Li/Li+ during Li battery cycling, it has been found to be advantageous for the cell construction to utilize a salt composition of electrolyte that (i) induces formation of free radicals during electrolyte reduction, which leads to electrolyte polymerization on the anode surface in the voltage range from around 1.3 V vs. Li/Li+ to around 3.1 V vs. Li/Li+ and (ii) exhibits high SEI density with a low concentration of voids or vacancies within the SEI and a high concentration of cross-links. As specific examples, electrolyte compositions exhibiting such properties may comprise some electrolyte solvent additives (such as, for example, fluoroethylene sulfite (FES), vinylene sulfite (VS), vinyl ethylene sulfite (VES), and other favorable solvents and their combinations that have high reduction potential, from around 1.3 V vs. Li/Li+ to around 3.1 V vs. Li/Li+) or comprise some favorable electrolyte salts or salt-based additives (such as, for example, some of the salts discussed above—some of the rare earth salt(s), alkaline metal salt(s) of FSI or I-comprising salts, such as LiI) or both a favorable salt and favorable solvent(s). As an illustrative example, an electrolyte comprising I anions and a DME solvent does form a favorable SEI at above 1.5 V vs. Li/Li+ even though a regular electrolyte based on a pure DME solvent does not get reduced at such a high potentials.

For some applications, the addition of a combination of two or more of the above-discussed salts into a Li-ion battery electrolyte mixture, for example, may be advantageous. Examples of such a combination of metal salts may include a combination of two different salts of La, such as lanthanum hexafluorophosphate (La(PF$_6$)$_3$) and lanthanum imide (for example, La(N(SO$_2$CF$_3$)$_2$)$_3$) and LiPF$_6$. Alternatively, examples of such a combination of uncommon metal salts may include a combination of different Li salts, such as a mixture of LiPF$_6$, LiFSI, and LiI. Alternatively, examples of such a combination of metal salts may include a combination of alkaline metal salt(s) of FSI and I-comprising compositions, such as a mixture of LiFSI and MgI$_2$.

The relative concentrations of the different salts may also vary depending on the particular compositions and application of interest, with lower relative concentrations of salts providing less benefit and higher relative concentrations of salts eventually beginning to reduce the ionic conductivity of the active ions (Li ions in the case of rechargeable Li batteries) to the point of negatively impacting overall performance. The particular trade-offs and correspondingly appropriate concentrations will vary from application to application.

In other embodiments, the attachment of certain species or their combinations to either the binder or to a functional polymer at the surface of active particles, or directly to the surface of active particles is used to assist in improving SEI stability and coulombic efficiency (CE). For example, the attachment of cations of metal(s) having a valence higher than 1 (e.g., +2, +3, +4, or +5), such as Ca, La, Fe, or Sn (or V), have been found to assist in improving SEI stability and CE of Li-ion batteries comprising high capacity electrodes, such as anodes comprising Si. Other examples include attachment of certain anions of composition similar to that of the anions of the Li-ion (or other metal-ion) salts used in the ion battery electrolyte (e.g. —PF$_6^-$), such as polymers containing the anions in their structure. Still other examples include polymer chains of the structure similar to that of the polymerized and cross-linked electrolyte solvent(s), such as vinylene carbonate, vinylene sulfite, and vinyl ethylene sulfite among others. Still other examples include polymer chains containing moieties having strong solvating affinity to the Li ions and providing Li-ion hopping within the polymer layer while at the same time excluding solvation shell from the solute Li ions. By assisting in at least partial desolvation of Li ions prior to entering the SEI layer and eventually active particles, irreversible electrolyte losses associated with the decomposition of electrolyte solvent and the trapping of Li within the formed SEI layer can be reduced. Examples of such moieties include (but are not limited to) ethylene carbonate fragments, propylene carbonate fragments attached or comprising part of polymer chain, and so on.

In still other embodiments, improvements in SEI stability and CE of Li-ion batteries comprising high capacity electrodes may be obtained by at least partial replacement of low molecular weight Li salts with higher molecular weight Li salts (oligomeric or polymeric). The improvements may be realized via incorporation of the higher molecular weight Li salts into the SEI during formation, which reduces the diffusivity of solvent molecules through the SEI and, at the same time, supports Li diffusion through the SEI containing the salts.

In still other embodiments, improvements in SEI stability and CE of Li-ion batteries comprising high capacity electrodes may be further obtained by at least the partial replacement of "regular" low molecular weight carbonate electrolyte solvents (such as propylene carbonate, ethylene carbonate, diethyl carbonate, dimethyl carbonate, etc.) with a solution of higher molecular weight (oligomeric or polymeric) solvent that forms a dense SEI and a "neutral" solvent, which exhibit substantially reduced decomposition on positive or negative electrodes and thus do not significantly contribute to electrolyte decomposition and SEI buildup (compared to "regular" carbonate solvents). In an ideal case, the neutral solvent has virtually no participation in electrochemical processes or SEI formation. As discussed above, the high molecular weight polyelectrolyte solvent does form a dense SEI, but once the SEI has formed, the diffusion coefficient of this solvent within the SEI becomes very small, which reduces the SEI growth rate. In an ideal case, the high molecular weight solvent cannot penetrate through the formed SEI, thus minimizing or ultimately preventing undesired and uncontrolled SEI growth. In this way, growth of the SEI may be made self-limiting.

In Li-metal and Li-ion batteries, cathodes and anodes often demand different electrolyte composition and properties for optimum performance. For example, Li-metal anodes may require an electrolyte composition that prevents dendrite growth and forms a dense and robust SEI layer during electrolyte reduction. In this case, suitable electrolyte solvents may comprise, for example, ethers or carbonates. Many of such solvents, however, may induce unfavorable reactions on the cathodes. For example, in the case of high voltage cathodes (such as cathodes exposed to potentials above around 4.4 V vs. Li/Li+ during cell operation and having an average delithiation potential of above 3.8 V vs. Li/Li+, such as high voltage lithium cobalt oxide (high voltage LCO), high voltage lithium nickel cobalt manganese oxide (NCM), nickel cobalt aluminum oxide (NCA), lithium manganese phosphate (LMP), and others) and even more so in the case of very high voltage cathodes (such as cathodes exposed to potentials above around 4.8 V vs. Li/Li+ during cell operation, such as regular, doped, or coated Li$_2$CrMn$_3$O$_8$, LiCrMnO$_4$, LiFeMn$_3$O$_8$, Li$_2$CoMn$_3$O$_8$, LiCOMnO$_4$, LiNiVO$_4$, LiNiMn$_3$O$_8$, LiFePO$_4$F, Li$_2$FePO$_4$F, LiCoPO$_4$, Li$_2$CoPO$_4$F, LiCoPO$_4$F, LiCoAsO$_4$, LiNiSO$_4$F, LiNiPO$_4$F, very high voltage NCM, and many others) ethers and carbonates (including the fluorinated solvents) typically oxidize, inducing gas generation and rapid cell failure. Other electrolyte solvents, such as dinitriles or sulfones and others, offer exceptionally high oxidative stability. In some cases, the smaller chain dinitriles and their functionalized variants (including fluorinated dinitriles), such as malononitrile, succinonitrile, glutaronitrile, adiponitrile, and pimelonitrile may be particularly attractive electrolyte solvents for high and ultra-high voltage cathodes. Larger chain dinitriles can also be used. Linear sulfones, such as ethylmethyl sulfone and dimethyl sulfone, asymmetric sulfones like ethyl-i-propyl sulfone, and cyclic sulfones like sulfolane, and their fluorinated versions, are also attractive electrolyte solvents for high voltage cathodes and in some cases for ultra-high voltage cathodes. Other solvents (such as cyclic esters, etc.) may also exhibit good oxidation stability at high potentials and may be used in electrolytes for high and ultra-high voltage cathodes. One of the best approaches to confirm compatibility of electrolytes (e.g., electrolytes comprising suitable solvents with high oxidation resistance) with high and ultra-high voltage cathodes is to produce symmetric cells where one of the electrodes is a regular high voltage (or ultra-high voltage) cathode and another electrode is the same electrode but in an at least partially delithiated state. By moving Li back and forth between the two cathodes (e.g., of nearly the same composition) and monitoring cell capacity and resistance, electrolyte compatibility with such high voltage or ultra-high voltage cathodes can be identified.

Unfortunately, nearly all of the known electrolytes that perform particularly well with high voltage (and particularly with ultra-high voltage) cathodes induce rather poor SEI on the anode and thus perform poorly in a real cell with a regular anode, such as a graphite or silicon-comprising anode, or Li metal or Li alloy anode, to provide a few illustrative examples. It may therefore be desirable to utilize electrolytes based primarily on one type of solvents on the anode and another type of solvents on the cathode. One way to produce such a cell is to introduce a solvent-impermeable solid electrolyte membrane in between the cathode and the anode. However, such a process dramatically increases cell manufacturing costs and reduces cell energy density (due to additional weight and volume of such membranes).

Several alternative designs and techniques are disclosed herein, which may be used as stand-alone approaches or in combination.

In one embodiment, the SEI may be first pre-formed on the anode using the most favorable solvents (such as carbonate(s) or ether(s), including fluorinated ones, their mixtures, etc.) and salts (e.g., LIFSI, LiI, etc.). In this case, the cell electrolyte may be selected to be stable on the high voltage (or very high voltage) cathode. Since the SEI is pre-formed, reduction of the electrolyte on the anode does not induce too much cell degradation. In order to improve chemical stability of the anode with the pre-formed SEI, it may be de-lithiated so that its potential increase above 2 V vs. Li/Li+ (preferably above 2.5 V vs. Li/Li+ but below 3.5 V vs. Li/Li+). In this case, the SEI-coated anode reactivity with traces of $O_2$ and moisture in the atmosphere of the cell assembling line may be reduced. To further reduce its reactivity, the anode may be infiltrated with a solvent which becomes solid at the temperature of the cell assembling room (or cell assembling enclosure) and thus exhibits relatively smaller permeability by $O_2$ and moisture or has a noticeably smaller solubility limit for $O_2$ and moisture. Examples of suitable solvents may include, but are not limited to: (i) high melting point carbonates (such as EC (melting point=35° C.), FEC (melting point=20° C.), VC (melting point=19° C.), VEC, etc.); (ii) high melting point sulfones (such as sulfolane (melting point=27.5° C.), its fluorinated version, etc.); (iii) high melting point sulfites (such as fluoroethylene sulfite (FES), vinylene sulfite (VS), vinyl ethylene sulfite (VES), ethylene sulfite (ES), etc.); (iv) high melting point dinitriles (such as malononitrile (melting point=31° C.), succinonitrile (melting point=50° C.), etc.), and others. As an alternative or complimentary technique to reduce SEI-coated anode reactivity, the anode may be coated with a polymer that is swellable in the electrolyte, but largely non-swellable in water. A suitable example of such a polymer is PVDF. As yet another technique to reduce SEI-coated anode reactivity, the anode may be coated with a thermally responsive polymer (a polymer which exhibits a phase transformation upon heating to above the cell assembling room temperature (e.g., above around 20° C.) but below around 80° C. to prevent electrolyte decomposition). It is preferable that such a polymer should not have pores and should not be swellable in water (thus having a low permeability by water) in a regular state (during cell assembling), but upon heating and the resulting phase transformation would induce pore formation and become permeable to the electrolyte solvent when the assembled cell is filled with electrolyte and further "activated" by exposure to elevated temperature (e.g., temperature between 20 and 80° C., depending on the particular polymer employed). In addition to a pure "initially solid" solvent, an "initially solid" electrolyte (e.g., Li salts dissolved in such a solvent above its melting point) may also be utilized.

The approach of SEI pre-formation and solvent-filling described above is particularly suitable for electrodes comprising microporous or mesoporous particles, comprising active material. Examples of such anodes may include, for example, anodes comprising microporous (e.g., pores below 2 nm) and mesoporous (e.g., pores between 2-50 nm) particles comprising Si as an active material. Examples of such cathodes may include, for example, microporous (e.g., pores below 2 nm) and mesoporous (e.g., pores between 2-50 nm) particles comprising metal fluoride(s) (such as $CuF_2$, $FeF_2$, $FeF_3$, $NiF_2$, $AgF_2$, $CoF_2$, $NiF_2$, $BiF_3$, $BiF_5$, LiF, and their mixtures and alloys, among others). Other examples of such cathodes may include, for example, microporous (e.g., pores below 2 nm) and mesoporous (e.g., pores between 2-50 nm) particles comprising S or $Li_2S$, or other conversion type materials and their alloys, mixtures and composites, to name a few. Still other examples of such cathodes may include, for example, microporous (e.g., pores below 2 nm) and mesoporous (e.g., pores between 2-50 nm) particles comprising high voltage cathode materials described above (high voltage LCO, high voltage NCM, NCA, LMP, $Li_2CrMn_3O_8$, $LiCrMnO_4$, $LiFeMn_3O_8$, $Li_2CoMn_3O_8$, $LiCOMnO_4$, $LiNiVO_4$, $LiNiMn_3O_8$, $LiFePO_4F$, $Li_2FePO_4F$, $LiCoPO_4$, $Li_2CoPO_4F$, $LiCoPO_4F$, $LiCoAsO_4$, $LiNiSO_4F$, and $LiNiPO_4F$, to name a few examples). Particles comprising from 0.1 vol. % to 75.0 vol. % of pores in the 0.3 nm to 50 nm range, for example (or more preferably in the 0.3 nm to 20 nm range) have been found to be particularly suitable.

In other embodiments, the electrolyte on the anode and on the cathode may be separated only initially during the so-called "SET formation", but eventually become a uniform solution as solvents (or salts) are mixed together. This approach may be relatively low cost and safe to use in an industrial setting. In one example, one electrode (such as a carbon or silicon-comprising anode) may be infiltrated with a solvent that remains solid during cell fabrication and provides a very good SEI forming ability when at slightly elevated temperatures when mixed with a salt and/or when mixed with another co-solvent. Examples of suitable solvents include, but are not limited to: (i) high melting point carbonates (such as EC (melting point=35° C.), FEC (melting point=20° C.), VC (melting point=19° C.), VEC, etc.); (ii) high melting point sulfites (fluoroethylene sulfite, FES, vinylene sulfite, VS, VES, etc.), etc. After infiltration and cooling to below the solvent melting point, this solid electrode (e.g., a Si-comprising anode) may be cut, stacked with a separator and counter electrode (e.g., a cathode), and assembled into a cell. The cell may then be infiltrated with electrolyte (and preferably sealed) for the "formation" cycle and further used in applications. In some embodiments, a separator may also be filled with a solvent, which is solid at the cell assembling temperature. During the formation cycle, Li may be first extracted from the cathode at elevated potentials. The electrolyte may be selected to be stable against oxidation at the cathode. When Li ions move towards the anode they pass through the state where the initially solid "solvent" gets mixed with the electrolyte(s) and melts. In an ideal way, the "initially solid" solvent at the anode has a significantly higher Li ion solvation energy (e.g., due to a higher dielectric constant) and replaces the initial electrolyte solvent molecules forming a majority of the solvation shell around the Li ions. When the Li ions reach the anode surface, they become preferentially surrounded by the molecules of the initially solid solvent that forms a good and stable (favorable) SEI. At the same time, the "initially solid" solvent molecules (e.g., mostly EC, VC, FEC, or others) mostly do not reach the cathode, allowing the electrolyte (e.g., with mostly dinitrile(s) solvent(s)) to form a stable SEI on the cathode. The temperature of the "cell formation" may be adjusted within a window (e.g., a 0-45° C. range) to achieve the most favorable performance. Over time all solvents (and salts) remaining in the cell will become mixed together. However, since by this time the SEI on the cathode and the anode becomes nearly fully formed and resistive against further solvent penetration, the undesirable cell degradation may be greatly minimized. It is preferable for the SEI on the anode to exhibit a higher dielectric constant than the remaining of the electrolyte to assist with Li ion desolvation and to reduce electrolyte solvent insertion into the SEI and decomposing. As stated previously, Si-based anodes and high voltage cathodes are used in this example for illustrative purposes only. Similar conceptual approaches may be utilized for Li and other anodes and for conversion-type cathodes in order to optimize the SEI forming on each electrode independently. Also, in addition to a pure "initially solid" solvent, an "initially solid" electrolyte (e.g., Li salts dissolved in such a solvent above its melting point) may also be utilized.

The approach of high melting point solvent-filling described above may be particularly suitable for electrodes comprising microporous or mesoporous particles, comprising active material. Examples of such anodes may include, for example, anodes comprising microporous (e.g., pores below 2 nm) and mesoporous (e.g., pores between 2-50 nm) particles comprising Si as an active material. Examples of such cathodes may include, for example, microporous (e.g., pores below 2 nm) and mesoporous (e.g., pores between 2-50 nm) particles comprising metal fluoride(s) (such as $CuF_2$, $FeF_2$, $FeF_3$, $NiF_2$, $AgF_2$, $CoF_2$, $NiF_2$, $BiF_3$, $BiF_5$, LiF, and their mixtures and alloys, among others). Other examples of such cathodes may include, for example, microporous (e.g., pores below 2 nm) and mesoporous (e.g., pores between 2-50 nm) particles comprising S or $Li_2S$, or other conversion type materials and their alloys, mixtures and composites, to name a few. Yet other examples of such cathodes may include, for example, microporous (e.g., pores below 2 nm) and mesoporous (e.g., pores between 2-50 nm) particles comprising high voltage cathode materials described above (high voltage LCO, high voltage NCM, NCA, LMP, $Li_2CrMn_3O_8$, $LiCrMnO_4$, $LiFeMn_3O_8$, $Li_2CoMn_3O_8$, $LiCoMnO_4$, $LiNiVO_4$, $LiNiMn_3O_8$, $LiFePO_4F$, $Li_2FePO_4F$, $LiCoPO_4$, $Li_2CoPO_4F$, $LiCoPO_4F$, $LiCoAsO_4$, $LiNiSO_4F$, and $LiNiPO_4F$, to name a few examples).

In still other embodiments, the electrolytes on the anode and on the cathode may be separated by utilizing a polymer electrolyte on at least one of them. In one example (e.g., using a polymer electrolyte on an anode) an anode is produced with a polymer (such as a polyethylene oxide, PEO) infiltrated with (swollen in) a solvent that is generally favorable for the anode SEI formation (e.g., with carbonates comprising FEC, VC, VEC, EC, etc., or sulfites such as ES, FES, VES, etc., or their mixtures, etc.). To minimize reaction of a salt with moisture and $O_2$ residues present in the cell assembling room, the solvent-comprising polymer (e.g. PEO) may be infiltrated with a Li salt-free SEI-forming solvent (or solvent solution/mixture). The solvent-comprising polymer-infiltrated anode may then be assembled into a cell. The cell may then be filled with an electrolyte compatible with a cathode. Since the anode is surrounded with a polymer electrolyte, it may form a favorable SEI between the polymer electrolyte and its surface. The liquid electrolyte solvent molecules which are harmful to the anode mostly do not reach its surface, at least during the SEI formation cycles. The solvent(s) infiltrated into the polymer electrolyte (such as FEC, VC, VEC, FEC, EC, ES, FES, or VES, or their solution/mixture, etc.) infiltrating the anode that exhibit poor performance on the cathode largely do not reach its surface, at least during the formation cycles and SEI formation. The opposite configuration may also be used—a polymer electrolyte swollen in the cathode-compatible solvent(s) may infiltrate the cathode prior to cell assembling and filling with anode-most compatible electrolyte.

The above approach of using a polymer electrolyte on at least one of the electrodes may be particularly suitable for electrodes comprising microporous or mesoporous particles, comprising active material. Examples of such anodes and cathodes may be similar to those provided above.

The electrodes comprising microporous or mesoporous particles, comprising active material, may require a particular composition of electrolyte for optimal performance. For example, the anode particles (such as anode particles comprising 0.5-95 wt. % of a high capacity alloy-type or conversion-type anode material, such as Si, Sn, Al, Mg, Sb, etc.) comprising 0.1 vol. %-75% vol. % of pores in the range from 0.3 nm to 30 nm (particularly pores in the range from 1 to 15 nm) may be preferably exposed to electrolyte of the particular compositions in order to form the most stable SEI with favorable properties, while providing a high rate performance in a cell. In one embodiment, such compositions may comprise the following elements: (i) 0.2-5M of Li salt(s) and (ii) a particular solvent mixture/solution. Such a solvent mixture may preferably comprise 30-99% of solvent(s) having a low dielectric constant (preferably below 25, even more preferably below 10) and 1-60% of solvent(s) having a high dielectric constant (preferably above 40). Such solvent(s) having a high dielectric constant may preferably exhibit at least a 0.3V higher reduction potential compared to the solvent(s) in this mixture, which have a low dielectric constant. Such a solvent mixture may also preferably comprise 40-99% of linear solvent molecules and 1-60% of cyclic solvent molecules. Such a solvent mixture may further preferably comprise 20-99% of molecules of solvent(s) having a melting point below −45° C. (even more preferably below −55° C.) and 1-70% molecules of solvent(s) having a melting point above −15° C. (even more preferably above −5° C.). Such a solvent mixture may further preferably comprise 1-99% of fluorinated solvent(s). One illustrative example of a suitable electrolyte is 1.03M $LiPF_6$, 0.02M LiBOB, and 0.4M LiFSI salt solution in the mixture of the following solvents: 1.5 wt. % VC, 20 wt. % FEC, 5 wt. % EC, 40 wt. % butyrate (such as methyl butyrate), 23 wt. % EMC, 10 wt. % PC, and 0.5 wt. % adiponitrile.

Figure 2:
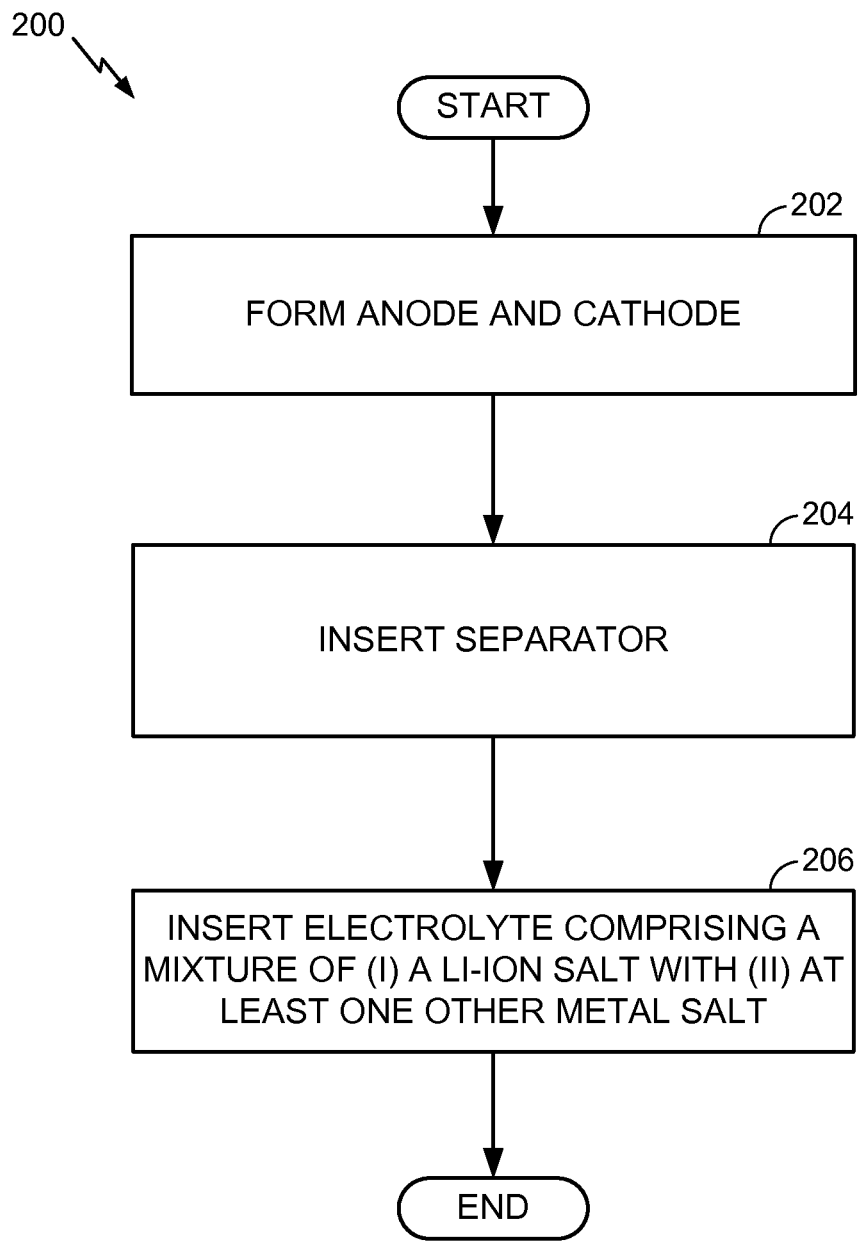
FIG. 2 is a flow chart illustrating an example battery fabrication method.

FIG. 2 is a flow chart illustrating an example battery fabrication method. In this example, a Li-ion battery is fabricated for illustration purposes, and it will be appreciated that the illustrated steps are not to be interpreted as requiring the ordering shown or any other ordering unless made clear by the description above. The method 200 includes forming (block 202) or otherwise providing anode and cathode electrodes, with the anode being a high capacity anode having a Li capacity of at least 400 mAh/g. The method 200 further includes inserting (block 204) or otherwise providing a separator electrically separating the anode and the cathode, and inserting (block 206), filling with, or otherwise providing a suitable electrolyte ionically coupling the anode and the cathode.

In this example, the electrolyte comprises a mixture of (i) a Li-ion salt with (ii) at least one other metal salt. The metal of the at least one other metal salt is selected as one that has a standard reduction potential below −2.0 V vs. SHE (and more preferably below −2.3 V vs. SHE).

As discussed in more detail above, in some designs, the metal of the at least one other metal salt may be a rare earth element, such as Y, La, Se, and Ce. The at least one other metal salt may also be an imide salt. The metal of the at least one other metal salt may also be an alkali or alkaline earth element, such as Cs, Mg, Sr, and Ba. The metal of the at least one other metal salt may also be a transition metal, such as Zr, Hf, Ta, and Cu.

As also discussed in more detail above, in some designs the mixture making up the electrolyte may further comprise another salt that includes an iodine element, such as an iodide. Here, the mixture may further comprise a metal salt that includes an anion such as $SO3F^-$, $N(FSO_2)_2^-$, and $N(CF_3SO_4)_2^-$. In addition or as an alternative, the mixture may further comprise LiF. The anode, the cathode, or the separator may also comprise LiF.

Figure 3:
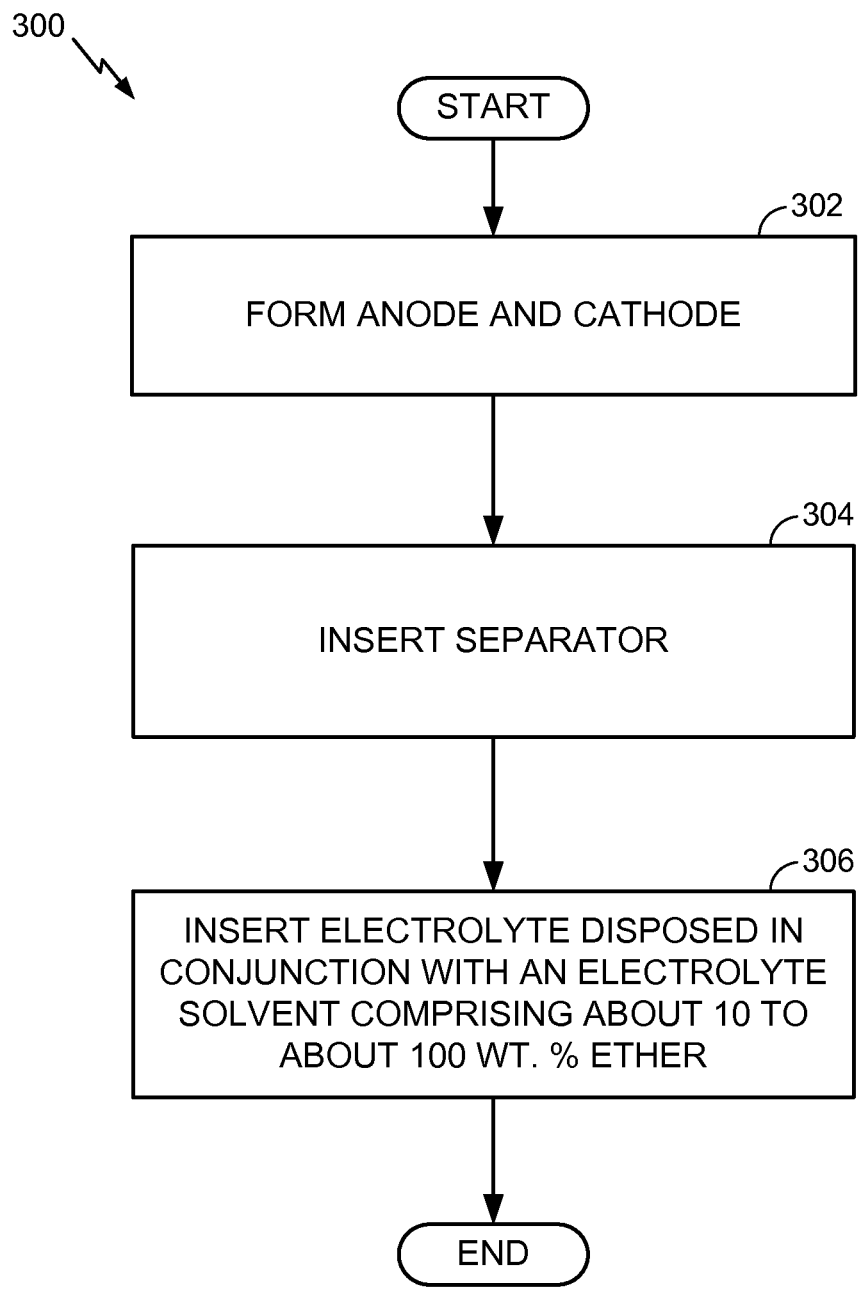
FIG. 3 is a flow chart illustrating another example battery fabrication method.

FIG. 3 is a flow chart illustrating another example battery fabrication method. In this example, a Li-ion battery for generating an average discharge voltage above 2.6 V is fabricated for illustration purposes, and it will be appreciated that the illustrated steps are not to be interpreted as requiring the ordering shown or any other ordering unless made clear by the description above. The method 300 includes forming (block 302) or otherwise providing anode and cathode electrodes, with the anode being a high capacity anode having a Li capacity of at least 400 mAh/g. The method 300 further includes inserting (block 304) or otherwise providing a separator electrically separating the anode and the cathode, and inserting (block 306), filling with, or otherwise providing a suitable electrolyte ionically coupling the anode and the cathode.

In this example, the electrolyte is disposed in conjunction with an electrolyte solvent comprising about 10 to about 100 wt. % ether.

As discussed in more detail above, in some designs, the electrolyte may comprise an iodine-containing salt. In some designs, the salt concentration in the electrolyte may exceed, for example, 2M. The electrolyte may also comprise an ether, with the battery being assembled from a cathode exposed to an ether-free electrolyte prior to assembly.

Figure 4:
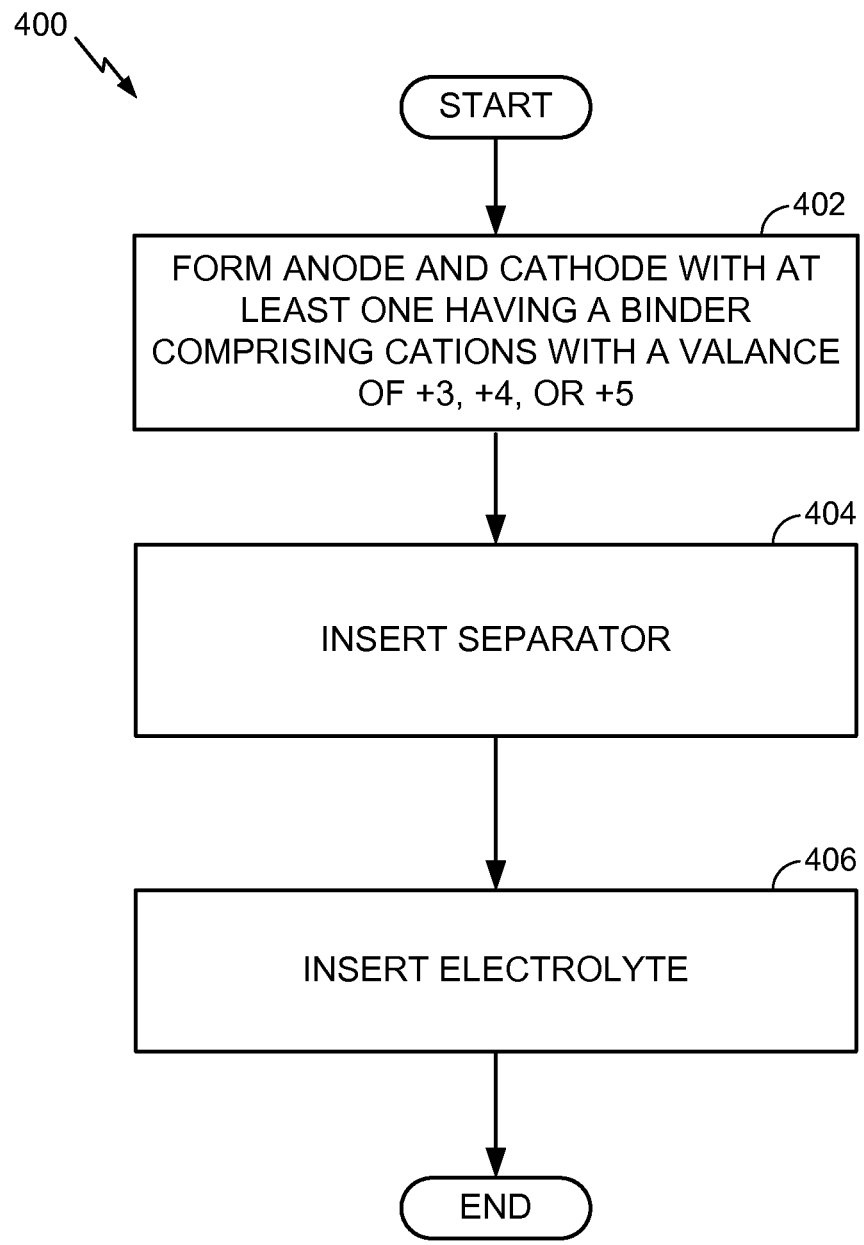
FIG. 4 is a flow chart illustrating another example battery fabrication method.

FIG. 4 is a flow chart illustrating another example battery fabrication method. In this example, a Li-ion battery is fabricated for illustration purposes, and it will be appreciated that the illustrated steps are not to be interpreted as requiring the ordering shown or any other ordering unless made clear by the description above. The method 400 includes forming (block 402) or otherwise providing anode and cathode electrodes, with the anode being a high capacity anode having a Li capacity of at least 400 mAh/g. The method 400 further includes inserting (block 404) or otherwise providing a separator electrically separating the anode and the cathode, and inserting (block 406), filling with, or otherwise providing a suitable electrolyte ionically coupling the anode and the cathode.

In this example, at least one of the electrodes comprises a binder having cations with a valance of +3, +4, or +5.

Figure 5:
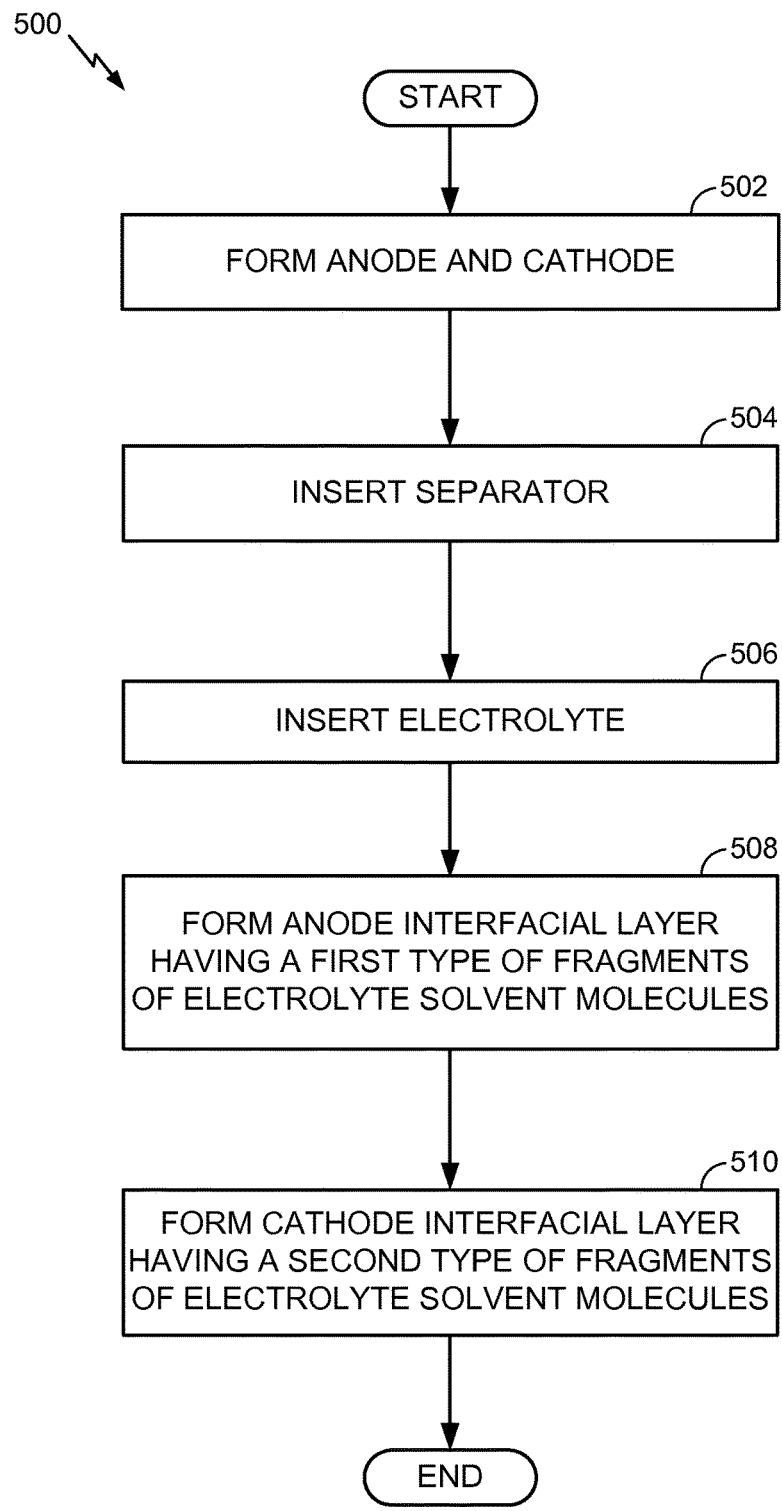
FIG. 5 is a flow chart illustrating another example battery fabrication method.

FIG. 5 is a flow chart illustrating another example battery fabrication method. In this example, a Li-ion battery is fabricated for illustration purposes, and it will be appreciated that the illustrated steps are not to be interpreted as requiring the ordering shown or any other ordering unless made clear by the description above. The method 500 includes forming (block 502) or otherwise providing anode and cathode electrodes, with the anode having an average delithiation potential below about 1 V vs. Li/Li+ and the cathode having an average delithiation potential above about 3.8 V vs. Li/Li+.

The method 500 further includes inserting (block 504) or otherwise providing a separator electrically separating the anode and the cathode, and inserting (block 506), filling with, or otherwise providing a suitable electrolyte ionically coupling the anode and the cathode.

Further, the method 500 additionally includes forming (block 508) or otherwise providing an anode interfacial layer (e.g., SEI) disposed between the anode and the electrolyte, and forming (block 510) or otherwise providing a cathode interfacial layer (e.g., SEI) disposed between the cathode and the electrolyte. Here, the anode interfacial layer may comprise a first type of fragments of electrolyte solvent molecules whereas the cathode interfacial layer may comprise a second type of fragments of electrolyte solvent molecules, with the first and second types of fragments being different from each other.

As discussed in more detail above, in some designs, the anode interfacial layer or the cathode interfacial layer may be a pre-formed interfacial layer constructed prior to battery cell assembly. Further, at least one of the electrodes may be a pre-filled electrode at least partially (and at least temporarily) filled with an electrolyte solvent having a melting point above a battery cell assembly temperature. In some designs, at least one of the electrodes may comprise active material particles that include at least 1 vol. % of pores having a size in the range of about 0.3 nm to about 20 nm.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A Li-ion battery, comprising:
   anode and cathode electrodes, wherein the anode is a high capacity anode having a Li capacity of at least 400 mAh/g;
   an electrolyte ionically coupling the anode and the cathode; and
   a separator electrically separating the anode and the cathode,
   wherein the electrolyte comprises a mixture of (i) a Li-ion salt with (ii) at least one other metal salt that is not a lithium ion salt, and
   wherein the metal of the at least one other metal salt has a standard reduction potential below −2.3 V vs. Standard Hydrogen Electrode (SHE).

2. The battery of claim 1, wherein the metal of the at least one other metal salt is a rare earth element.

3. The battery of claim 2, wherein the rare earth element is selected from the group consisting of Y, La, Se, and Ce.

4. The battery of claim 1, wherein the at least one other metal salt is an imide salt.

5. The battery of claim 1, wherein the metal of the at least one other metal salt is an alkali or alkaline earth element.

6. The battery of claim 5, wherein the alkali or alkaline earth element is selected from the group consisting of Cs, Mg, Sr, and Ba.

7. The battery of claim 1, wherein the metal of the at least one other metal salt is a transition metal.

8. The battery of claim 7, wherein the transition metal is selected from the group consisting of Zr, Hf, Ta, and Cu.

9. The battery of claim 1, wherein the anode comprises Si.

10. The battery of claim 1, wherein the mixture further comprises an additional salt that includes an iodine element.

11. The battery of claim 10, where the additional salt is an iodide.

12. The battery of claim 10, wherein the mixture further comprises a metal salt that includes an anion selected from the group consisting of $SO_3F^-$, $N(FSO_2)_2^-$, and $N(CF_3SO_4)^{2-}$.

13. The battery of claim 10, wherein the mixture further comprises LiF.

14. The battery of claim 10, where the anode, the cathode, or the separator comprises LiF.

* * * * *